July 19, 1960 A. R. BOOK 2,945,312

MEMORY AID

Filed Sept. 22, 1958

INVENTOR.
Austin R. Book

BY
Christy, Parmelee & Strickland
ATTORNEYS

United States Patent Office 2,945,312

Patented July 19, 1960

2,945,312

MEMORY AID

Austin R. Book, Blairsville, Pa.

Filed Sept. 22, 1958, Ser. No. 762,365

1 Claim. (Cl. 40—68)

This invention is for a memory aid particularly intended for use in making a temporary record of some succession of letters or numbers or combinations thereof, such as telephone numbers.

Since the invention is especially useful as a telephone aid it will be specifically described for this purpose, but this is by way of illustration and is not to be construed as limiting the invention to such use.

One using a telephone frequently looks up a number in a directory and then looks for a place to write it down, particularly if the call cannot be completed on the first attempt. The present invention provides a device which can be placed or mounted near a telephone having a number of wheels which may be independently rotated, but provided with indicia in the nature of letters or numbers that may be conveniently rotated to exhibit at a glace the telephone number to be called.

My invention may be more fully understood by reference to the accompanying drawing in which.

Figures 1, 2, 3, 4, 5, 6:
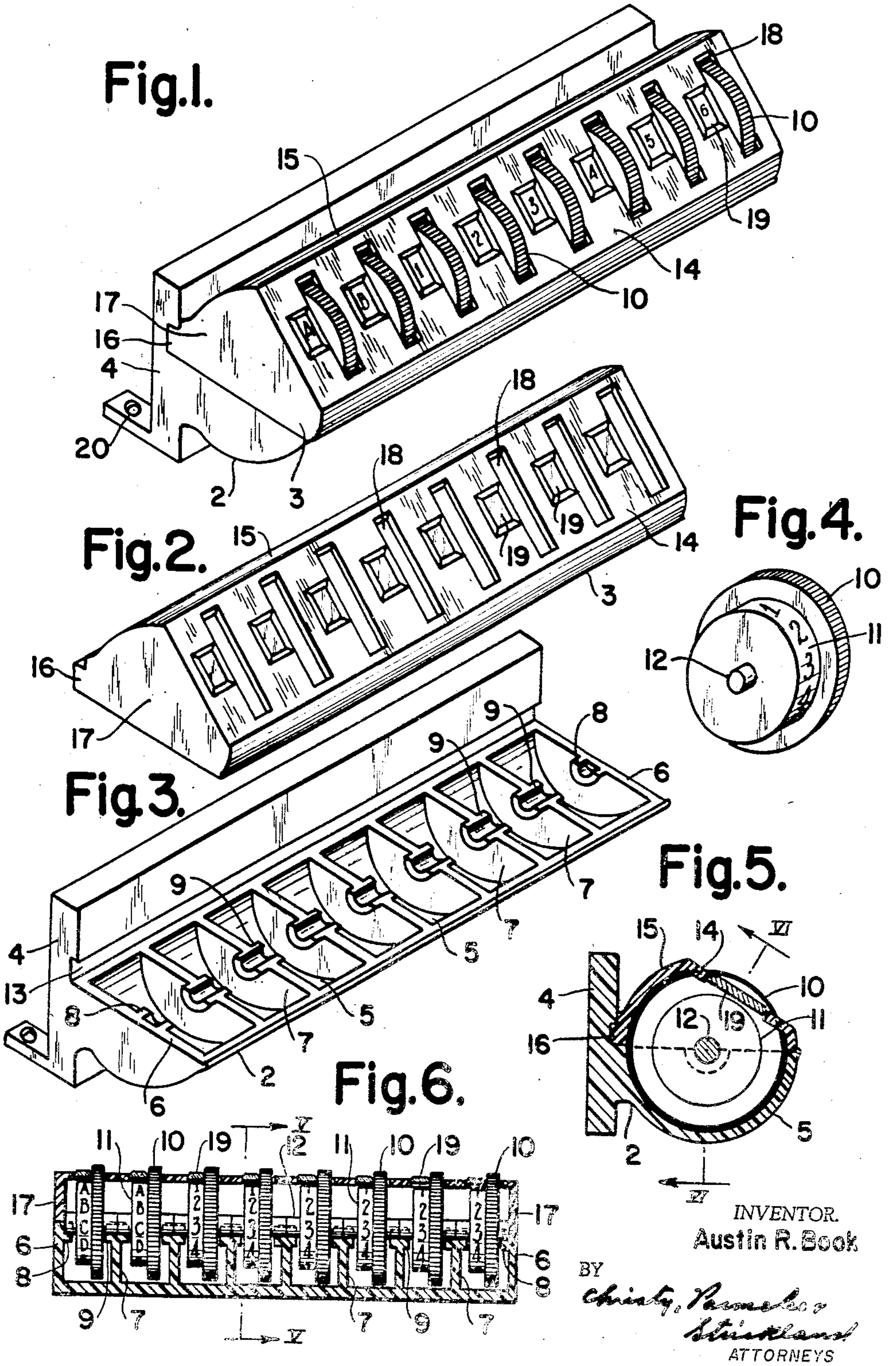
Fig. 1 is a perspective view of a memory aid involving my invention.
Fig. 2 is a perspective view of the covered casing.
Fig. 3 is a similar view of the body of the casing.
Fig. 4 is a perspective view of one of the wheels.
Fig. 5 is a transverse section in the plane of line V—V of Fig. 6.
Fig. 6 is a longitudinal section in the plane of line VI—VI of Fig. 5.

Referring to the drawings, my invention is formed with a body member 2 and a cover member 3 which are separately formed, but subsequently joined together preferably in such manner as to prevent separation.

The body member 2 has a vertical panel portion 4 from the front of which projects a trough-like extension 5 having end walls 6 and transverse partitions 7, the member 2 being molded as an integral piece from a plastic. The inner faces of the end walls each have a projection 8 formed thereon at the top edge which are concaved to form bearings for the wheel shafts hereinafter described. The transverse partitions 7 have similar bearing-forming projections 9 on each face thereof in the top edge with the concavity for the shaft extending across the top of the partition.

Set in each compartment formed by the partitions is a wheel element having a knurled flange portion 10, an indicia bearing cylinder portion 11, and an axially extending central shaft or pin 12 at each end face. The shaft extensions 12 are of such length and diameter as to be rotatably fitted into the several bearing elements 8 and 9 with their ends abutting so that the wheels have no relative endwise movement. The flanges 10 are of greater diameter than the cylindrical indicia bearing portions 11. A succession of characters, either numbers or letters or other indicia, are printed around the periphery of portions 11. For a telephone number accessory, the first two wheels at the left have letters, or groups of letters as arranged on a telephone dial about the periphery of part 11, while the remaining five dials have numerals reading consecutively from 0 to 9. For educational purposes all wheels could have letters, or some could have numbers with intervening wheels with +; —; ÷; ×, or like directive indicia. Other arrangements of characters will suggest themselves to those skilled in the art, and the number of compartments and wheels will be varied according to the purpose of the device.

The panel portion 4 may have a longitudinal recess 13 formed therein. The cover member 2 is of generally inverted trough shape with a sloping panel portion 14, a rounded back portion 15, a longitudinal bead 16 that fits in the recess 13, and generally triangular end walls 17. It is of the same size and contour as the trough-like bottom portion, so that the confronting edges meet and may be cemented together.

The sloped panel area 14 has a series of transversely elongated slots 18 therein positioned so that the knurled flanges 10 of the wheels project therethrough, so that each wheel may be separately rotated. Adjacent each of the slots to the left thereof is a small window opening 19 through which an indicia on each wheel is visible. The inner face of the panel area 14 is in such close proximity to the periphery of portion 11 of each wheel that the wheel cannot escape from its bearings, acting to confine the wheels. I have shown each window with a transparent covering which if desired may be a lens to magnify the numbers, or may be flat as shown, or the windows may be merely openings with no cover.

When made from plastic, the wheels are simply dropped into place in the bottom member, the cover is put into place, and the parts cemented, or heat fused, although it is of course feasible to use removable fasteners wherever desired. The body may have one or more extensions 20 formed thereon to either enable it to be set on a support or screwed to a wall or otherwise immovably mounted in a phone booth or elsewhere.

While I have shown and described one specific embodiment of my invention, various changes and modifications may be made therein.

I claim:

A memory aid device of the class described comprising a casing having a body member and a cover member, the body member having a trough-like formation and a back flange, transverse webs in the trough and end walls for the trough providing partitions dividing the trough into a series of compartments, the top edge of each partition being provided with bearing grooves therein, a wheel in each compartment having shaft elements resting in the bearing grooves in the partition at each side of the wheel, each wheel having an indicia bearing cylindrical portion and a knurled flange portion of greater diameter than the cylindrical portion, the cover member covering the trough having an inclined panel portion with slots therein through which the knurled flanges project and a series of windows through which a restricted portion of the indicia bearing portion of each wheel is visible, the cover confining the wheels in position, said cover and back flange having an interfitting tongue and groove connection for joining them together.

References Cited in the file of this patent

UNITED STATES PATENTS

| | | |
|---|---|---|
| 1,915,563 | Wainwright | June 27, 1933 |
| 2,492,592 | Perry et al. | Dec. 27, 1949 |
| 2,850,822 | Masters | Sept. 9, 1958 |
| 2,876,569 | Staab et al. | Mar. 10, 1959 |